Dec. 12, 1933.  D. W. BERLIN  1,939,099
AUTOMATICALLY VARIABLE CHANGE SPEED GEAR DEVICE
Filed July 15, 1932  4 Sheets-Sheet 1

D. W. Berlin
INVENTOR

By: Marks & Clerk
ATTYS.

Dec. 12, 1933.  D. W. BERLIN  1,939,099
AUTOMATICALLY VARIABLE CHANGE SPEED GEAR DEVICE
Filed July 15, 1932  4 Sheets-Sheet 2

D. W. Berlin
INVENTOR

By: Marks & Clerk
Attys.

Dec. 12, 1933.                D. W. BERLIN                 1,939,099
           AUTOMATICALLY VARIABLE CHANGE SPEED GEAR DEVICE
                    Filed July 15, 1932           4 Sheets-Sheet 3
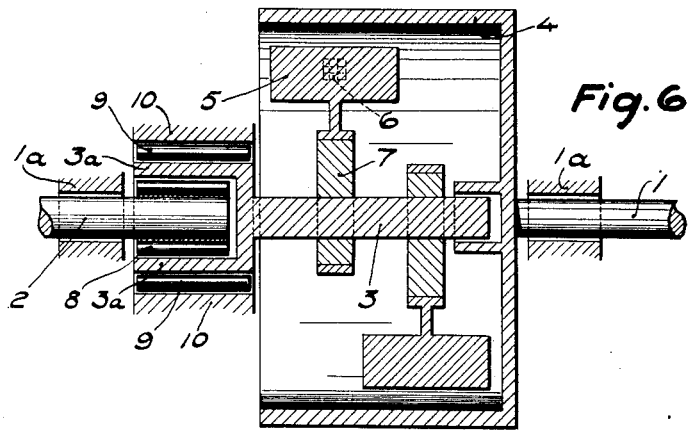
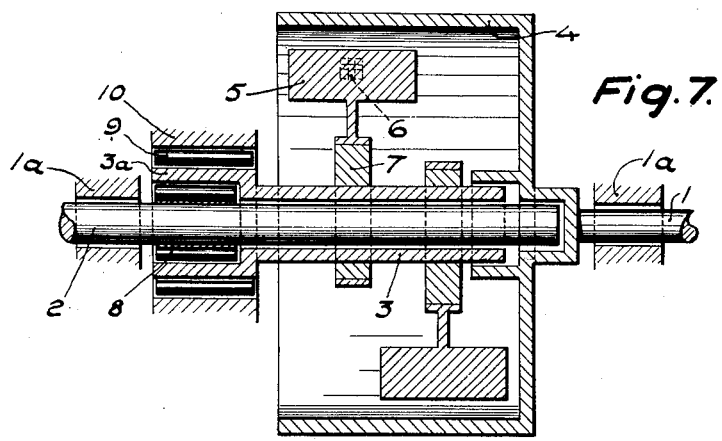
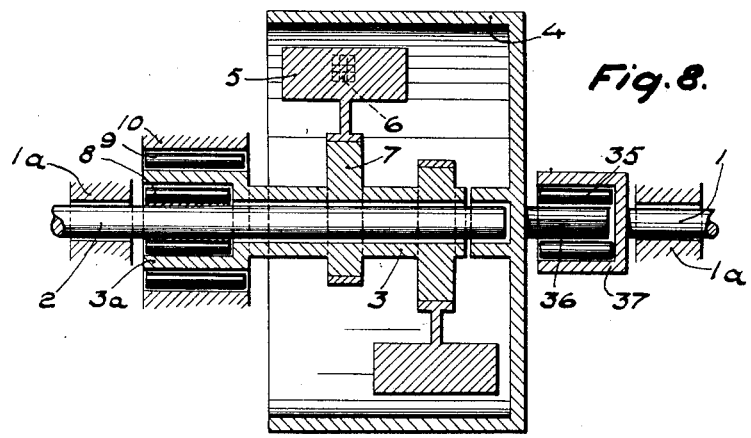

Dec. 12, 1933. D. W. BERLIN 1,939,099
AUTOMATICALLY VARIABLE CHANGE SPEED GEAR DEVICE
Filed July 15, 1932 4 Sheets-Sheet 4

D. W. Berlin
INVENTOR

By: Marks & Clerk
Attys.

Patented Dec. 12, 1933

1,939,099

UNITED STATES PATENT OFFICE 1,939,099

AUTOMATICALLY VARIABLE CHANGE SPEED GEAR DEVICE

David Werner Berlin, Rasunda, Sweden

Application July 15, 1932, Serial No. 622,797, and in Sweden April 29, 1932

16 Claims. (Cl. 74—34)

The present invention relates to an automatically variable change speed gear device of the type, which automatically transforms and transmits a torque from one shaft to another, so that when the resistance of the latter, the secondary shaft, increases beyond the torque at direct coupling between the primary shaft and the secondary shaft, the speed of the latter decreases at the same time as its moment of torsion correspondingly increases.

In the following description the invention is described substantially with regard to its great importance for motor vehicles which, however, does not involve, that it is not applicable or important also in other technical branches.

In order that such an automatically working gear device should meet all the requirements nowadays made upon such a device in motor vehicles it must correspond to the following conditions:

1. When the motor vehicle meets with a resistance not to be overcome by direct coupling the gear device should adjust its moment of torsion automatically to be of sufficient magnitude at the cost of the speed of the vehicle.

2. When a sudden stop of the motor vehicle is desired the motor should be able to act as a brake by means of the gear device.

3. In driving downhill the gear device should be able to transmit a braking force from the motor in such a manner, that the speed is regulated without applying the brakes.

4. In driving on an even or sloping road there should be the possibility of utilizing the inertia of the motor vehicle to drive the vehicle without the motor taking part in the motion.

The invention described below fulfills all the requirements stated in the above four paragraphs and therefore the invention is a considerable improvement on all gear devices known before.

The present invention is substantially characterized by a fly-wheel secured to the primary shaft and connected to and carrying centrifugal weights, said centrifugal weights being eccentrically mounted on a shaft which may be of tubular form and which is connected to the secondary shaft and rotates only in the direction of rotation of the latter, said secondary shaft running free with respect to said first-mentioned shaft in the direction of rotation. The present invention may be applied and modified in various manners. A number of the most important embodiments of the invention are summarized in the following paragraphs and described in the subsequent description.

1. Automatically variable gear device, characterized by a fly-wheel connected to the primary shaft and carrying centrifugal weights which are excentrically mounted on the intermediate shaft connected to the solid secondary shaft, or on the surrounding tubular shaft which drives the secondary shaft forwards in the direction of rotation but with respect to which the secondary shaft is running free in the same direction, the fly-wheel being preferably connected to the secondary shaft and to a free-running intermediate shaft by means of a planetary gear system, the planet wheels of which are mounted on the fly-wheel of the primary shaft.

2. Automatically variable gear device, characterized by a fly-wheel connected to the primary shaft and carrying centrifugal weights eccentrically mounted on a tubular shaft which surrounds the secondary shaft and drives it forward in the direction of rotation but with regard to which the secondary shaft runs free in the same direction, said fly-wheel being connected, by means of a planetary gear system, to the secondary shaft and to an intermediate shaft on the primary side which intermediate shaft runs free and is arranged to equalize the motion, said planetary gear system having its planet wheels mounted on the secondary shaft, so that only gear wheels with external teeth have to be employed, whereby silent motion is obtained at load.

3. Automatically variable gear device, characterized by a fly-wheel running relatively free and connected to the primary shaft by means of a planetary gear system and also connected to and carrying centrifugal weights eccentrically mounted on the tubular shaft which surrounds the secondary shaft and drives the latter forward in the direction of rotation but regarding to which the secondary shaft is running free in the same direction, whereby both the positive and the negative impulses of the centrifugal weights are directly utilized.

In all these constructional forms the tubular shaft, about which the centrifugal weights are eccentrically mounted, is connected to the secondary shaft by means of check mechanisms which cause the secondary shaft to take part in the rotation during the positive period of the centrifugal weights but release it during their negative period. Further the arrangement is such that the tubular shaft, about which the centrifugal weights are eccentically mounted, are prevented, by means of check devices, from rotating, when the centrifugal weights endeavour to rotate it against the direction of rotation during the negative period.

4. Concerning the check device the arrangement may be such that they are reversible for motion in a certain direction, when the intermediate shaft is only rotating in the direction of rotation of the secondary shaft, while the secondary shaft is at the same time running free, with regard to the intermediate shaft, in the direction of rotation.

5. Further the primary shaft may be connected to the fly-wheel by means of check devices in such a manner that these are running free during the negative period of the centrifugal weights.

The constructional forms described above are shown diagrammatically on the accompanying drawings, in which Figs. 1, 2 and 3 are longitudinal sections of the constructional forms described in the preceding paragraphs 1, 2 and 3 respectively.

Figs. 6, 7 and 8 are longitudinal sections of constructional forms according to the paragraphs 4 and 5.

Figure 9:
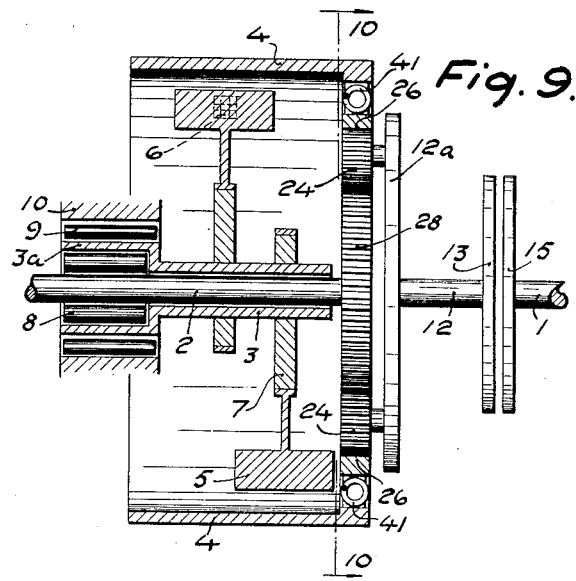
Figure 10:
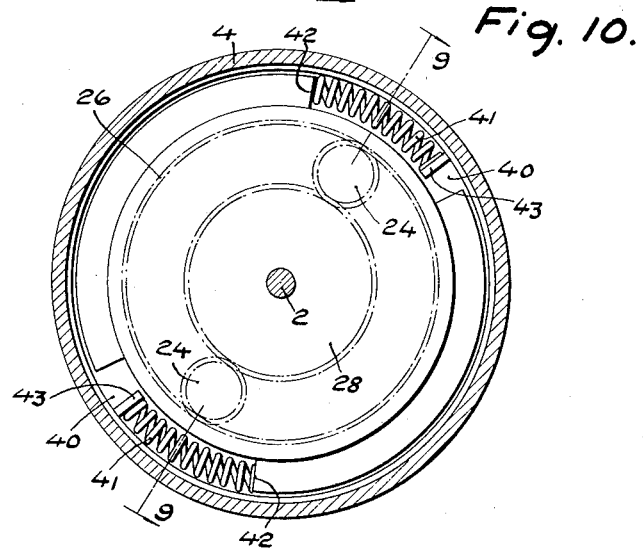

Figs. 9 and 10 show sections on line 9—9 and 10—10 resp. in the same figures of a modified part.

Figure 4:
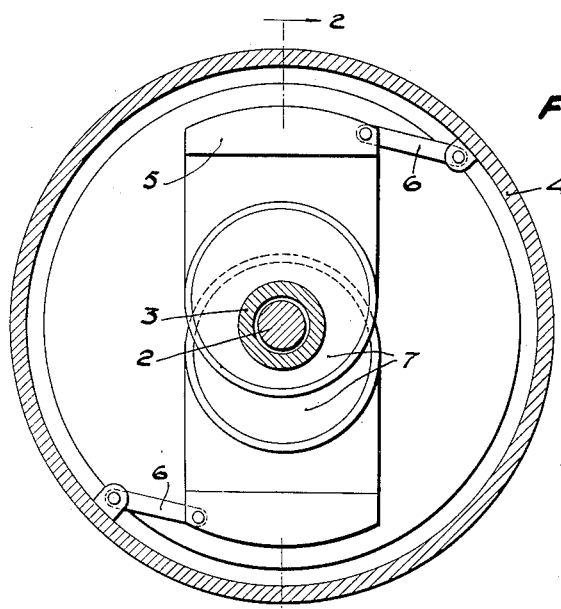
Fig. 4 is a section on line 4—4 of Fig. 1.

In all the forms of construction shown 1 is the primary shaft, 2 the secondary shaft, 1a shaft bearings, 3 an intermediate shaft, 4 the primary fly-wheel, 5 the centrifugal weights, 6 rods connecting the centrifugal weights to the fly-wheel, and 7 eccentrics secured to the intermediate shaft on which eccentrics the centrifugal weights are mounted. Fig. 4 shows a transverse section on line 4—4 of Fig. 1 how the centrifugal weights 5 are positioned with regard to the fly-wheel 4 and the eccentrics 7 and also how the connecting rods 6 are mounted. 8 and 9 are two sets of check rollers. The check rollers 8 are positioned between the secondary shaft 2 and a check cylinder 3a formed on the intermediate shaft 3. The check rollers 9 are positioned between the cylinder 3a and the fixed frame 10 of the apparatus, see Fig. 1A.

The check roller sets are both single-acting, i. e., they exert checking action in one direction, but the set 9 is adjustable also for free motion, which is necessary, when the secondary shaft is to be rotated in a direction opposite to that of the primary shaft 1, as is described below. The arrangement of the check device is seen in Fig. 1A, which shows a transverse section on line 1A—1A of Fig. 1. The secondary shaft 2 is provided with members 2a having usual locking surfaces 2b one for each check roller 8, said locking surfaces being so arranged that the secondary shaft is allowed to rotate in a clockwise direction but in the opposite direction with regard to the cylinder 3a. By means of an elastic device, represented by a spring 8a in the drawings, each roller 8 is actuated in a direction towards the locking position. By means of similar locking surfaces 10a on the frame, the rollers 9 check the shaft 3 against rotation in a counter-clockwise direction, and, by means of an elastic device represented by springs 9a, also the rollers 9 are actuated in the direction towards the locking position.

By means of an annular member 9b provided with projections 9c, one behind each roller 9, the rollers 9 may however, be adjusted in such a manner, that the cylinder 3a is running free also in the clockwise direction.

To the secondary shaft 2 there is fixed an internal gear 2c meshing with the planet wheels 11, which are mounted on the primary fly wheel 4. The centre wheel 11a and its shaft 12 will to a certain degree smooth the movement of the secondary shaft 2 by virtue of their inertia. At forward motion the primary fly-wheel 4 is connected to the primary shaft 1 by means of a friction clutch 13, 15. At reverse motion the centre wheel 11a and the centre shaft 12 are connected to the primary shaft 1 by means of a friction clutch 15, 16. These connections are accomplished by displacement of the member 15. At reverse motion the check rollers 9 are adjusted into free-running position and the fly-wheel 4 is braked and locked by a brake 17. When a vehicle provided with this gear device is to be driven down a steep slope the primary shaft 1 is connected to the shaft 12 and braking is effected by the motor and, if required, also by the fly-wheel 4 being braked by the brake 17, so as to get a suitable speed.

Figure 1:
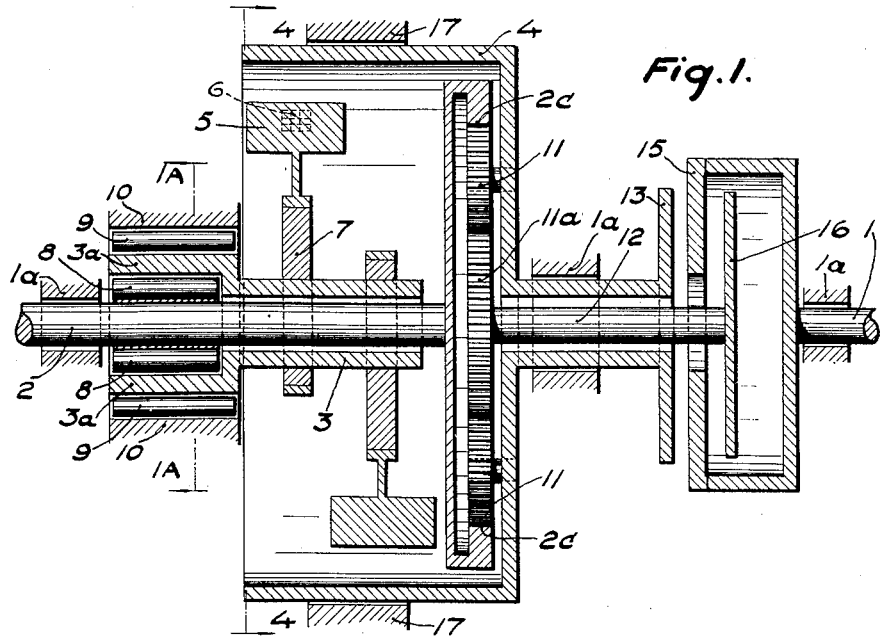
Fig. 1A is a section on line 1A—1A of Fig. 1.
Figure 2:
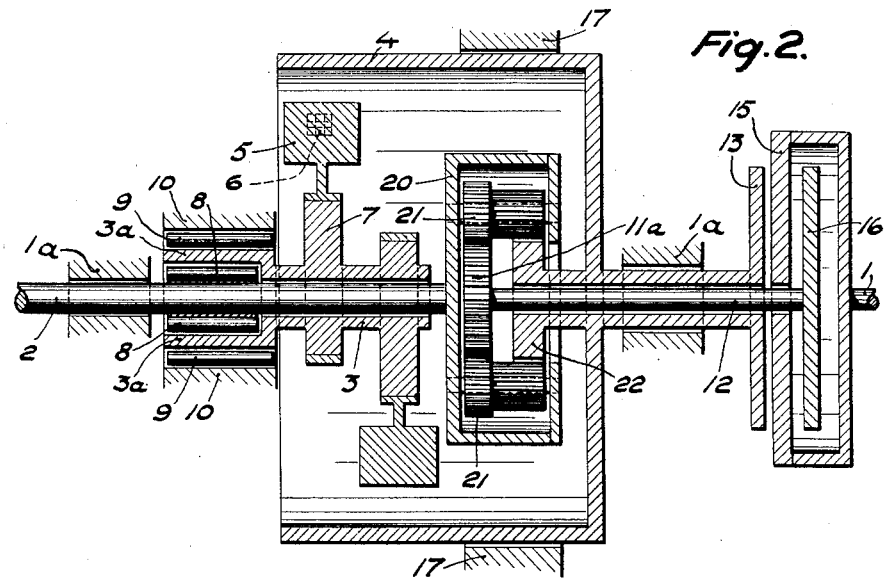
Figure 1A:
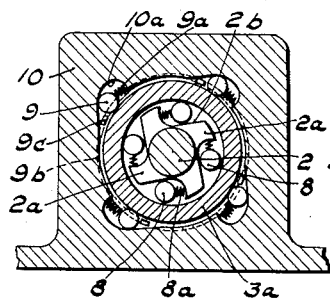

The form of construction according to Fig. 2 differs from that shown in Fig. 1 only in the arrangement of the planetary gear. To the secondary shaft 2 there is secured a casing 20, in which the planet wheels 21 are mounted. Each planet wheel consists of two pinions with different (alternatively equal) diameters. The greater pinion meshes with the centre wheel 11a and the smaller one meshes with the centre wheel 22, which is formed on or secured to the fly-wheel 4. The primary shaft 1 is connected to said primary weights 4 or to the shaft 12 in the same manner as in Fig. 1. Shifting into free-running position is also effected in similar manner. In this constructional form the planetary gear is provided with only external cogs for the purpose of obtaining silent operation, which may be further improved by oblique teeth on the wheels.

Figure 3:
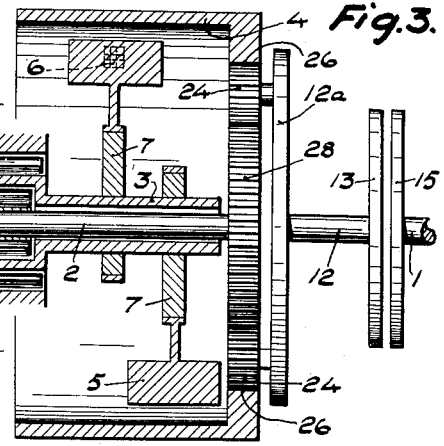
Figure 5:
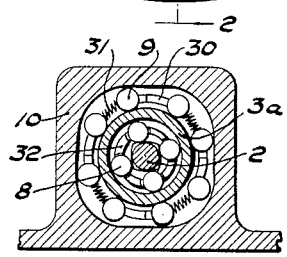
Fig. 5 is a section on line 5—5 of Fig. 3.

In the constructional form according to Figs. 3 and 5 the motion of the primary shaft 1 is transmitted to the primary fly-wheel 4 by means of planet wheels 24 mounted on fly-wheel 12a, which is secured to the central shaft 12 and meshing partly with an internal gear 26 on the fly-wheel 4 and partly with a centre wheel 28 fixed to the secondary shaft 2. The intermediate shaft 3 is formed in similar manner as in Fig. 1, i. e. it is of tubular form, but the check device differs from that described above. The cylinder 3a is connected to the secondary shaft 2 by means of double-acting check rollers 8 and to the frame by means of check rollers 9 which are also double-acting. In Fig. 5, which is a transverse section on line 5—5 of Fig. 3, the arrangement of the check rollers is shown diagrammatically. The check rollers 9 are mounted in a roller holder 30 and actuated by springs 31 inserted between the rollers. The rollers 8 are mounted in a roller holder 32 and are preferably also actuated by springs. In this constructional form when the secondary shaft is desired to rotate in a direction opposite to that of the primary shaft the check rollers 8, 9 are shifted into a position opposite to that corresponding to forward motion. Then the centrifugal weights will exert a drawing action upon the secondary shaft during the negative period because the cylinder 3a turns the secondary shaft by means of the check rollers 8. During the positive period the cylinder 3a is locked against the frame 10.

The constructional form shown in Fig. 6 differs from those described above substantially thereby that it has no planetary gear and that the intermediate shaft is not tubular throughout its whole length. The intermediate shaft 3 is tubular only on a length corresponding to the length of the rollers 8, 9. The tubular part is marked by 3a as before. The check rollers are here shiftable for motion in a certain direction when the intermediate shaft 3 is only rotating in the direction of rotation of the secondary shaft 2, while the latter is at the same time running free, in the direction of rotation, regarding to the intermediate shaft.

Fig. 7 shows a constructional form having no planetary gear but in which the intermediate shaft is, as above described, tubular throughout its length.

In the constructional form shown in Fig. 8 the fly-wheel 4 is running free regarding to the primary shaft 1 during the negative period of the centrifugal weights. Thus said negative period may be directly utilized for the purpose of increasing the speed of the fly-wheel 4 and storing energy in it during the negative period. Thereby the great advantage is obtained, inter alia, that the negative period is considerably shortened. The connection between the primary shaft and the fly-wheel 4 is effected by means of check rollers 35 inserted between a shaft fixed to the fly-wheel 4 and a cylinder 37 fixed to the primary shaft. The engaging surfaces are so arranged in a known manner, that said shaft 36 and the fly-wheel are running free during the negative period of the centrifugal weights.

It will be understood that the invention may be varied in different ways within the scope of the claims.

Figs. 9 and 10 show how, in the constructional forms comprising a planetary gear, the toothed ring 26 is mounted resiliently in order to obtain silent operation. The toothed ring here forms a special part fitted in a circular opening in the fly-wheel so as to be rotatable therein. In the ring 26 there are for example two openings 40 for springs 41. Each spring rests with one end against one end surface 42 of the corresponding opening and with the other end against a projection 43 on the fly-wheel 4. By this simple arrangement the advantage is obtained that the direction of tooth pressure between the toothed ring and the planet wheels remain unaltered during the positive and negative periods of the centrifugal weights, whereby the teeth of the ring 26 will not hammer against the teeth of the planet wheels and vice versa. It is of course possible to mount some or other of the wheels resiliently instead of the toothed ring, in order to obtain the same result.

Having now described my invention, what I claim as new and desire to secure by Letters Patent is:

1. An automatically variable change-speed gear device for transmission of power, comprising a primary shaft, a secondary shaft, a fly-wheel, a free running shaft, a planetary gear connecting the fly-wheel, free running shaft and secondary shaft, an intermediate shaft, centrifugal weights eccentrically mounted on said intermediate shaft, means connecting the secondary shaft with the intermediate shaft whereby the secondary shaft may revolve freely in one direction with relation to the intermediate shaft.

2. A gear device as claimed in claim 1, characterized in that the planet wheels of the planetary gear are mounted on the fly-wheel.

3. A gear device as claimed in claim 1, characterized in that the planet wheels of the planetary gear are mounted on the secondary shaft.

4. A gear device as claimed in claim 1, characterized in that said intermediate shaft is of tubular form, said connecting means operating to establish a positive driving connection from the primary shaft to the secondary shaft when the speed of the former shaft exceeds the speed of the latter shaft.

5. A gear device as claimed in claim 1, characterized in that said free running shaft is fixed to the center wheel of the planetary gear, and means for connecting said primary shaft to the free running shaft to cause the secondary shaft to revolve in the opposite direction.

6. A gear device as claimed in claim 1, characterized in that said planetary gear includes an internal gear wheel fixed to said secondary shaft and engaging the planet wheels of said planetary gear, said planetary gear also including a center wheel fixed to said free running shaft.

7. A gear device as claimed in claim 1, characterized in that said planetary gear includes two-part planetary gear wheels and a carrier therefor fixed to said secondary shaft, and center gear wheels connected respectively with the free running shaft and the primary shaft and meshing respectively with the two parts of the planetary gear wheels.

8. A gear device as claimed in claim 1, characterized by the provision of a clutch for coupling the primary shaft to the fly-wheel during forward motion and for coupling the primary shaft to the free running shaft during rotation in the opposite direction.

9. A gear device as claimed in claim 1, characterized in that said primary shaft is rotatable independently of the fly-wheel and the free running shaft.

10. A gear device as claimed in claim 1, characterized by the provision of a double acting coupling associated with the primary shaft and operable to connect the latter, on the one hand, to the fly-wheel and, on the other hand, to the center wheel of the planetary gear.

11. A gear as claimed in claim 1, characterized in that said planetary gear includes a casing carried by the secondary shaft, two-part gear wheels mounted in said casing, and two center gear wheels meshing with the parts of the planetary gear wheels, one of the center gear wheels being connected with the fly-wheel and the other being adapted for connection with the primary shaft.

12. A gear as claimed in claim 1, characterized in that said planetary gear includes an internal gear member carried by the fly-wheel, planet wheels meshing with said internal gear member and coupled with the free running shaft, and a center wheel connected with the secondary shaft.

13. A gear as claimed in claim 1, characterized by the provision of means for controlling the rotary movement of the intermediate shaft.

14. A gear as claimed in claim 1, characterized by the provision of means for controlling the rotary movement of the fly-wheel.

15. A gear as claimed in claim 1, characterized in that said connecting means includes a plurality of elastically mounted check members.

16. A gear as claimed in claim 1, characterized in that said planetary gear includes a ring gear member connected to the fly-wheel and resiliently movable circumferentially thereof.

DAVID WERNER BERLIN.